G. S. GOSLEE.
FLUID PRESSURE REGULATING DEVICE.
APPLICATION FILED FEB. 8, 1909.

949,180.

Patented Feb. 15, 1910.

Witnesses:
A. J. Graefe
A. A. Olson

Inventor:
George S. Goslee
By Joshua R. H. Potts
His Attorney

UNITED STATES PATENT OFFICE.

GEORGE S. GOSLEE, OF WAUKEGAN, ILLINOIS.

FLUID-PRESSURE-REGULATING DEVICE.

949,180.  Specification of Letters Patent.  Patented Feb. 15, 1910.

Application filed February 8, 1909. Serial No. 476,675.

*To all whom it may concern:*

Be it known that I, GEORGE S. GOSLEE, a citizen of the United States, residing at Waukegan, county of Lake, and State of Illinois, have invented certain new and useful Improvements in Fluid-Pressure-Regulating Devices, of which the following is a specification.

My invention relates to devices designed for the regulating of the pressure of fluids whereby a constant and uniform pressure may be maintained in an outlet or service pipe.

The object of my invention is to provide a device of the character mentioned by means of which the flow of fluid may be automatically regulated, so that while fluid enters one side of the regulator at a variable, ordinarily high pressure, the pressure of the fluid issuing therefrom will be constant and uniform, the device being adapted to be adjusted so as to reduce the pressure of the fluid to such an extent that the latter may be economically and effectually consumed.

A further object of my invention is to provide a regulator as mentioned which will be so constructed as to avoid chattering or fluttering of the regulating valve when a small quantity of fluid is passing through the same, a fault to be found in the great majority of regulators generally in use at the present time.

A still further object is to provide a regulator which, in the event of exceedingly high pressure being produced in the inlet chamber thereof, as in the case of an emergency, will be adapted to entirely close, thereby acting as a notification or an alarm of such emergency.

Another object is to provide a regulator which will be perfectly balanced, and which will be of the highest possible efficiency though comparatively simple of construction.

Other objects will appear hereinafter.

With these objects in view, my invention consists in a regulator characterized as above mentioned and in certain details of construction and arrangement of parts all as will be hereinafter fully described and particularly pointed out in the claims.

Figure 1:
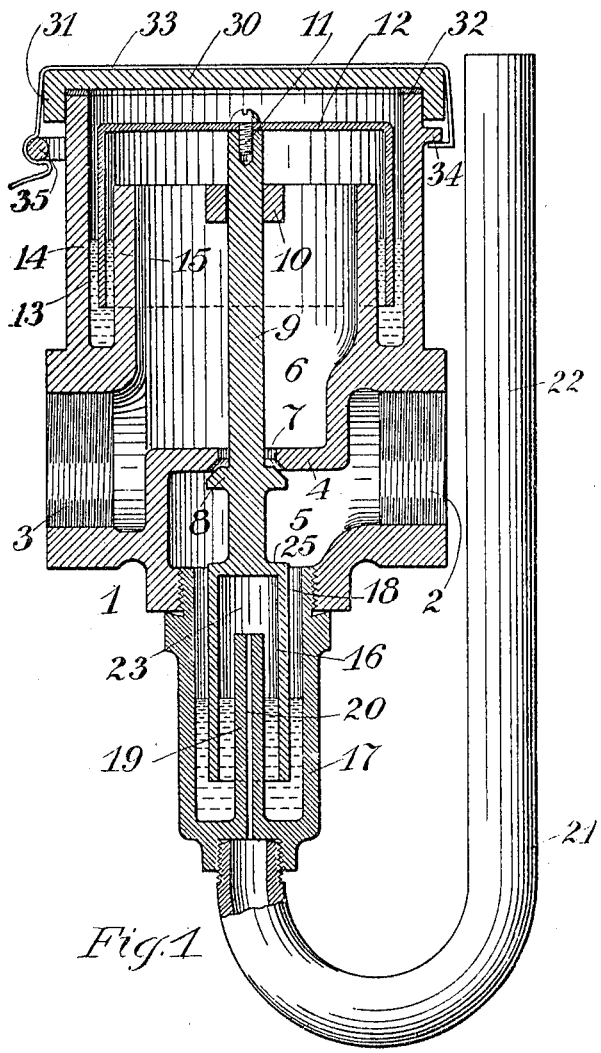
Figure 2:
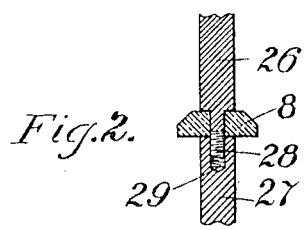

My invention will be more readily understood by reference to the accompanying drawings forming a part of this specification, and in which, Figure 1 is a sectional view of the preferred form of my regulator. Fig. 2 is a sectional detail of a modified form of valve adapted to be embodied in my regulator, showing the means employed in the attachment thereof to the valve stem.

Referring now to the drawings 1 indicates a cast metal valve casing or shell, the same being provided with pipe-formed inlet and outlet ports 2 and 3 respectively. The interior of said casing 1 is divided, by means of a partition 4, into chambers 5 and 6 communicating respectively with said ports 2 and 3, the chamber 5 being for convenience designated as the high pressure or inlet chamber and 6 as the low pressure or outlet chamber. Establishing communication between said high and low chambers is an opening or passage 7 provided in the substantially horizontally extending portion of the partition 4, said opening forming a seat for a disk valve 8. The stem 9 by which said valve 8 is carried extends upwardly from the latter through a guide 10. Suitably secured to the upper extremity of said stem 9, preferably by means of a screw 11 threaded into the upper extremity thereof, is a bell 12. The lower edge portion of said bell is immersed in mercury or other sealing liquid provided in an annular space 13 formed by the wall 14 of the casing 1 and an internal annular flange 15 formed integrally with said casing. By such construction the inner surface of the upper portion of the bell 12 is in direct communication with the chamber 6. Formed at or secured to the lower extremity of the valve stem 9 is a second bell 16, preferably of a diameter less than that of the bell 12. Accommodating said bell 16 is a tubular member or cup 17, the upper extremity of which is preferably in threaded connection with an opening 18 formed in the lower extremity of the casing 1, the same communicating with the chamber 5. The lower edge portion of the bell 16 is immersed in mercury or other sealing liquid provided in said member 17.

As shown in the preferable form of my regulator a centrally positioned, preferably integrally formed core 19 is provided in the member 17 through which extends a passage 20. Communicating with the lower extremity of said passage 20, the same being preferably in threaded connection with the lower extremity of the member 17 is an open ended substantially U-shaped tube 21, the vertically disposed end portion 22 of which is of any suitable length. Said tube establishes communication between the chamber 23 formed in the bell 16 above the surface of the sealing liquid and the atmosphere. In my modified form the core 19 and the tube 21 are dispensed with and in their stead a passage 24 leading from the chamber 23 is provided in the valve stem 9 which communicates with the chamber 6.

In practice the fluid under high or varying pressure is admitted through the port 2 into the chamber 5. The same passes therefrom through the valved opening 7 into the chamber 6, the gravity or weight of the valve and its associated parts being depended upon for producing the downward movement of said valve. Upon any rise in pressure in the chamber 6 above a certain predetermined point at which the valve has been adjusted, the latter will, because of the pressure applied to the inner interior of the bell 12 be elevated, thereby diminishing the dimensions of or throttling the passage 7, and hence restricting the flow of liquid from the chamber 5 therethrough. Upon such pressure in the chamber 6 becoming abnormal the bell 12 will be elevated to such an extent as to cause the entire closing of the valved passage, the same being so restricted until such pressure in said chamber is reduced by consuming of the fluid. Hence, it is evident that the pressure in the outlet chamber 6 will be kept constant and uniform.

It is in order that the high pressure in the chamber 5 shall not affect the free movement or working of the valve 8 by acting upon the under surface of the latter that I provide the bell 16. The upper surface 25 of said bell is formed with an area exactly the same as that of the under surface of the valve 8. By such provision it is evident that all pressure applied to the under surface of the latter will be counteracted by an equal pressure upon the upper surface of said bell, thereby obviously permitting of a free operation of said valve. The chamber 23, formed in the bell 16 being, in the form shown in Fig. 1, in communication, by means of the passage 20 and the passage through the tube 21, with the atmosphere, upon the elevation or lowering of said bell in which event said chamber necessarily increases or decreases in dimensions, air will be admitted thereto or exhausted therefrom to accommodate such changes in capacity, hence the free movement of the valve is not affected.

Upon a great excess of pressure in the chamber 5, as in the event of an emergency, such pressure will act upon the upper surface of the sealing liquid, provided in the member 17, exposed thereto or that contained between the inner surface of the member 17 and the outer surface of the bell 16, depressing the same, thereby causing the elevation of the liquid contained within said bell. If such excess pressure is high enough the liquid surrounding said bell will be depressed to such an extent as to force that contained within over the top of the core 19, in which event the same will enter the passage 20 passing down the same into the tube 21 where it will remain. Upon such extreme depression of the sealing liquid the latter will be forced below the lower edge of the bell 16, in which event the compressed fluid contained in the chamber 5 will enter the chamber 23. Such fluid will naturally descend the passage 20, the same tending to escape through the tube 21. However, such escapement will be prevented because of the sealing liquid already contained in said tube, such liquid obviously stopping the passage therethrough. The fluid thus being prevented from escaping will naturally act upon the upper surface of the interior of the bell 16, thereby forcing the latter upwardly and hence closing the valve 8. Upon such occurrence no fluid being fed into the outlet chamber, the transmitting devices, as for example gas burners, compressed air, motors, etc., in which said fluid is consumed, will cease operation, thereby serving as a notification or an alarm of the emergency, whereupon repairs may be made.

As shown in either of my forms of regulator the valves thereof are formed of metal. However, in some cases, as where certain acidiferous fluids, as for example illuminating gas, are passed through the regulators, such are inadequate inasmuch as the gases attack the metal with the result that in a comparatively short period of time said valves become inefficient. In order to remedy such fault I provide a valve formed of glass or other similar material not susceptible to action by illuminating gas or other like gases or fluids, it being evident with such provision the above stated inadequacy will be eliminated. In order to secure said valve to the valve stem, I preferably form the latter in two parts 26 and 27, as shown in detail in Fig. 2, the former being provided with a projection 28 adapted to be threaded into the tapped hole 29 provided for the reception of the same in the latter, the valve being centrally perforated to receive the projection 28, the same being held secure upon said valve stem between the extremities of the stem parts. However, I do not wish to be limited to such specific means of securing said valve, as any other suitable means might be employed without departing from the spirit of my invention.

Surmounting the top of the valve casing 1 is a cover 30, the depending peripheral flange portion 31 thereof being adapted to snugly receive the upper portion of said casing. Interposed between the upper edge of said casing and the upper surface of said cover is a gasket 32 of any suitable material.

A detachable spring member 33, the extremities of which are adapted to engage lugs 34 and 35 formed upon the outer surface of said valve casing is adapted normally to hold said cover in close connection with the upper edge of the valve casing. By such construction a substantially (not absolute) air-tight connection between said parts is effected. The restricted space above the bell 12 coöperates with the confine space below (namely the outlet chamber 6) serving as a check or cushion preventing any fluttering of the valve. However, although I have shown a preferred form of securing the cover to the casing, I do not wish to be limited thereto, as any other suitable means might be employed to accomplish the same end.

Having described my invention what I claim as new and desire to secure by Letters Patent is:

1. In a device of the class described, the combination with a casing having an inlet and an outlet chamber and ports therefor, of a passage establishing communication between said chambers, a vertically movable disk valve and a stem carrying said valve, the opposite sides of said valve being respectively exposed to said inlet and outlet chambers, means whereby increasing the pressure in said outlet chamber effects the seating of said valve, a sealed bell provided at the lower extremity of said valve stem exposed to said outlet chamber, the area of the upper surface of said bell being substantially the same as that of the side of said valve exposed to said inlet chamber, and a passage communicating with the chamber formed in said bell above the sealing liquid forming a communication between the same and the atmosphere, substantially as and for the purpose specified.

2. In a device of the class described, the combination with a casing having an inlet and an outlet chamber, ports therefor, a sealed bell provided in the outlet chamber, and a second sealed bell provided in the inlet chamber, of a stem connecting said bells, a disk valve carried by said stem adapted to throttle the passage establishing communication between said chambers, the area of the surface of said valve exposed to said inlet chamber being the same as that of the upper surface of said second mentioned bell, a core formed in a cup accommodating the last mentioned bell, a passage extending through said core communicating with the chamber formed in said bell above the sealing liquid coöperating therewith, and a curved tube connecting with said core passage, substantially as and for the purpose specified.

In testimony whereof I have signed my name to this specification in the presence of two subscribing witnesses.

GEORGE S. GOSLEE.

Witnesses:
   Joshua R. H. Potts,
   Janet E. Hogan.